Nov. 2, 1954  C. J. HELMERS  2,693,441
FEED PREPARATION FOR FURNACE BLACK PRODUCTION
Filed Jan. 2, 1951
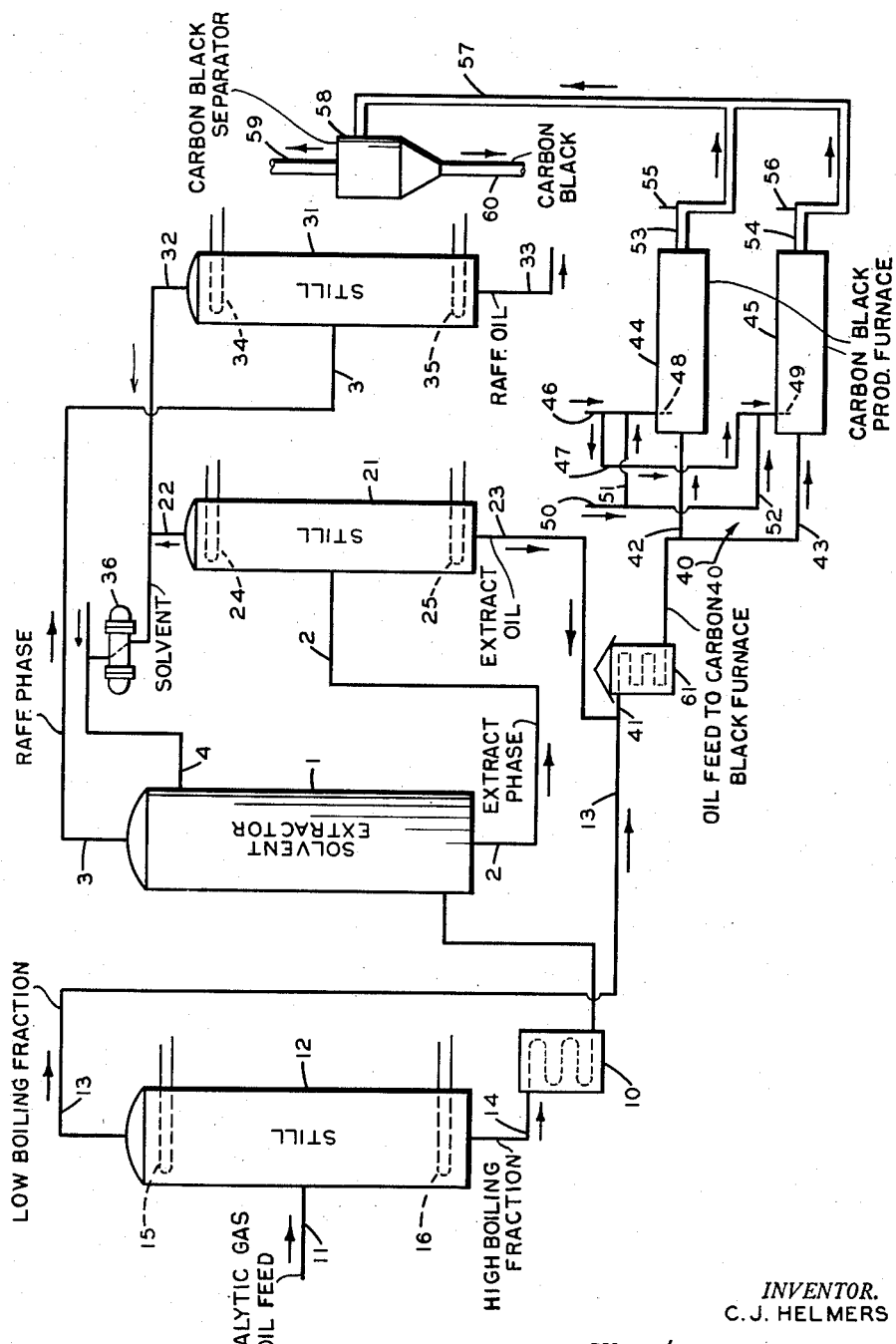
INVENTOR.
C. J. HELMERS
BY
ATTORNEYS United States Patent Office 2,693,441
Patented Nov. 2, 1954

2,693,441

FEED PREPARATION FOR FURNACE BLACK PRODUCTION

Carl J. Helmers, Bartlesville, Okla., assignor to Phillips Petroleum Company, a corporation of Delaware Application January 2, 1951, Serial No. 203,988

6 Claims. (Cl. 196—14.26)

This invention relates to a solvent extraction process. In one aspect it relates to a process for recovering solvent from an extract phase in an operation for the production of an improved oil feed and producing furnace carbon black therefrom.

In a solvent extraction operation for the separation of aromatic from nonaromatic gas oil boiling range hydrocarbons, two liquid phases are obtained. Solvents frequent times are specifically heavier than the hydrocarbon oils being treated, and under such conditions an extract phase will be removed from the bottom of the contacting zone. The nonaromatic hydrocarbons with some solvent in solution rise in the heavier solvent and are removed from the top of the vessel. A common method for the separation of dissolved solvent from the raffinate phase is by distillation in which the solvent is withdrawn from the top of the distillation vessel as overhead product. This solvent vapor may be condensed and returned to the extraction vessel as a portion of the solvent. The raffinate oil is then withdrawn as bottoms from this distillation vessel. The same general operation is frequently used for the recovery of the solvent from the extract phase in which the extract oil is withdrawn from the distillation column as bottoms and the solvent is taken overhead as vapor. This solvent vapor is likewise condensed and recycled as the main portion of the solvent to the extraction column.

When distilling the solvent from the extract phase and the extract oil contains aromatic hydrocarbons boiling, for example, between 350 and 400° F., a very significant amount, sometimes as much as ten per cent, of these low-boiling aromatic hydrocarbons has heretofore sometimes passed overhead in this distillation column with the normally lower boiling solvent. When using certain extraction solvents, this irregularity in solvent recovery from the extract phase occurs, and while using other solvents, this irregularity does not occur. It is believed that such irregularity in distillation may occur as a result of the azeotrope-forming tendency of certain aromatic hydrocarbons. In this fractionation operation concentration of the solvent is expected to approach 100 per cent in the upper portion of the fractional distillation column. However, in the presence of high concentration of certain solvents, the volatility of small portions of aromatic extract oil is greatly enhanced; and, for this reason, the lower boiling portion of such an extract oil tends to vaporize at a faster rate than would be expected. In other words, the activity of the low boiling portion of the extract oil in the presence of the high concentration of solvents is high; and, for this reason, some extract oil actually passes overhead from the extract oil distillation column with the solvent vapors even when the very best known commercial distillation columns are employed. Upon condensation of the overhead vapors, this extract oil also condenses and remains in solution in the solvent. Upon introduction of this condensate into the original extraction column as solvent, aromatic oil is introduced or recycled into this column at a point near the raffinate outlet. A large portion of the aromatic oil thus recycled is extracted from the solvent by the high concentration of raffinate in the upper end of the extraction column and leaves the column in solution with the raffinate from which it was originally extracted. This, of course, constitutes a serious loss in the overall efficiency of separation.

I have now found a combination process whereby catalytic gas oils obtained from catalytic cracking operations and having the low-boiling components present may be processed to produce a high yield of low aniline point furnace carbon black feed without encountering azeotroping difficulties in the extract recovery zone. By the method of this invention, a feed hydrocarbon is fractionated to segregate those constituents boiling below about 450° F., solvent extracting the higher boiling material with the solvent to produce a low aniline point extract phase, removing solvent from the extract phase and blending together the low-boiling fraction originally separated and the extract oil produced by the extraction. By this process a higher yield of specification feed stocks for producing carbon black is obtainable by extracting to a lower-than-specification aniline point and blending with the higher-than-specification aniline point material. The disadvantage of azeotrope formation in the solvent recovery step and contamination of raffinate oil is also avoided.

An object of my invention is to devise a process for the production of a low aniline point gas oil feed stock for use in producing furnace type carbon black.

Another object of my invention is to devise such a process in which the yield of carbon black feed stock oils is greater than obtained by normal methods.

Another object of my invention is to devise a process which is simple in operation for the production of such a carbon black feed stock.

Still another object of my invention is to devise such a process which is characterized by low operating costs.

Still other objects and advantages of my invention will be realized upon reading the following specification which, taken with the attached drawing, forms a part of this specification.

The drawing represents one embodiment of apparatus parts which may be used in practicing the process of my invention.

In the drawing, reference numeral 1 refers to the solvent extraction column of conventional type. Reference numerals 12, 21, and 31 refer to distillation columns in which the feed stock, extract phase and raffinate phase, respectively, are distilled. Elements 44 and 45 are carbon black producing furnaces, while element 58 is a means for separating carbon black from the gaseous effluent in the furnaces, for example, bag filters, electro-precipitator, etc. The distillation column 12 is equipped with a refluxing coil 15 and a reboiling coil 16. Stills 21 and 31 are provided with refluxing coils 24 and 34, respectively, and with reboiling coils 25 and 35, respectively. Inlet and outlet connections to these several vessels with interconnecting pipes will be identified in the following paragraphs which describes the operation of my process.

In the operation of the process of my invention, a catalytic gas oil boiling between about 350-410° F. and 750° F. (ASTM distillation) is conducted from a source, not shown, through a line 11 to the fractionation zone 12. This fractionation zone is so operated that constituents of the gas oil boiling below about 450° F. are separated and removed through line 13 as an overhead product. The gas oil constituents boiling higher than 450° F. are removed as a bottoms product through a line 14 and are conducted after cooling in a cooler 10 to the extraction zone 1. Solvent, which in this embodiment is considered to be specifically heavier than the hydrocarbon oil charged through line 14, is introduced into extraction column 1 through a solvent charge line 4. The charge oil to this column tends to rise upward therein while the heavy solvent follows a downward course. Accordingly, the raffinate phase is removed via overhead line 3 and is passed on through this line to the raffinate oil recovery column 31. This column is operated in such a manner that the solvent in solution in the raffinate oil is distilled overhead through line 32 as a vapor which is condensed in condenser 36 and the condensed solvent flows on through line 4 to the extraction column 1. The raffinate oil is removed from the bottom of this raffinate still 31 through a line 33 and is passed to subsequent storage for use as desired.

The extract phase is withdrawn from the extraction column 1 through a line 2 and is introduced into about the mid-portion of the extract recovery column 21. This column is operated in such a manner that the solvent is distilled overhead as a vapor through line 22. This distillate vapor passes on through a portion of line 32, is condensed along with the vapors from the raffinate column 31 in condenser 36 and the combined condensate is passed on through line 4 to the extraction column 1. The extract oil is removed from the extract recovery column 21 through a bottoms drawoff line 23. Oil from this line is combined with the overhead distillate vapors from still 12. This combined oil stream is passed on through line 41 through the heat exchanger 61 for temperature adjustment and then into the carbon black producing system indicated in the drawing by reference numeral 40. Makeup solvent may be introduced into the system through a line 4A, as needed.

Apparatus for making carbon black with the herein produced oil feed stock and methods for operating the apparatus are described in U. S. Patents Nos. 2,375,795 and 2,375,796.

Such apparatus broadly consists of cylindrical furnaces 44 and 45. These furnaces are equipped with oil charge lines 42 and 43, respectively. Feed oil, before being introduced through lines 42 and 43 into the furnaces, is preferably vaporized in the temperature adjusting or heater apparatus 61. A line 46 is provided for supplying air, from a source not shown, for burner 48 in furnace 44 and to line 47 which in turn supplies air to burner 49 for furnace 45. In case it is desired to introduce a fuel gas also to the burners 48 and 49, a line 50 is provided for conducting fuel gas from a source, not shown, to the individual lines 51 and 52 which in turn supply fuel to burners 48 and 49, respectively. Effluent gases from furnace 44, conducted therefrom through conduit 53 are cooled by water from a water spray 55, and are conducted therefrom on through conduit 57 to a carbon black separating apparatus 58. Effluent gases containing carbon black in suspension are removed from furnace 45 through conduit 54, are cooled by water from a water spray 56, and the cooled effluent is passed on through the line 57 to the carbon black separating apparatus 58. This carbon black recovery apparatus may be apparatus of conventional design such as, for example, an electric precipitator, cyclone separators, bag filters, or combinations of each. Conduit 59 is for discharge of gases after carbon black has been recovered. Conduit 60 is intended for conducting the separated carbon black from the recovery apparatus 58 to storage, pelleting, or subsequent use as desired.

When furfural is used as the extraction agent in the extraction zone 1, and a catalytic gas oil of a boiling range from 410° to 750° F. is used as the charge oil, the solvent to feed ratio may be selected from between the limits of 0.5:1 and 5:1. The temperature of contacting is usually within the range of 50° to 160° F. The extract oil produced from a catalytic gas oil feed of 125° to 160° F. aniline point is usually in the range of minus 75° to plus 20° F. The extract oil, of course, upon blending with the components of the catalytic gas oil boiling below 450° F., is increased in aniline point to equal that required by specifications of carbon black feed stock.

The particular operating conditions for the several stills will need be that merely required to give effective separation between the desired components. Still 12 is operated at such refluxing and reboiler temperatures as will give an overhead vaporous product having an end boiling point of about 450° F. The several temperatures maintained in stills 21 and 31 are such as required to distill overhead the solvent from the extract and the raffinate phases.

Another solvent which tends to form an azeotrope and adversely affect solvent recovery in the extract distillation still and the raffinate distillation still is methylcellosolve. This process is also applicable to the use of any other solvent which shows azeotrope forming tendencies with any of the lower boiling components of the gas oil charge stock.

Apparatus used for carrying out the process of my invention may, for the most part, be constructed of materials available commercially. Such auxiliary apparatus as pumps, valves, pressure gauges, recording apparatus, temperature indicating and recording apparatus, pressure and temperature controllers, or flow controllers, are not shown nor described for purposes of simplicity. The necessity for the use and the installation and operation of such auxiliary apparatus is well understood by those skilled in the art. It will be realized that the operation conditions of my process may be varied according to the specification of the product desired to be prepared.

The above described flow diagram is given for purposes of illustration and should not be regarded as limiting the invention, the scope of which is set forth in the following claims.

I claim:

1. A process for producing an improved furnace carbon black feed stock in increased yield based on the feed stock charged to the process comprising the steps of subjecting a catalytic gas oil feed stock having a boiling range from a temperature below 450° F. to about 750° F. and obtained from a catalytic cracking operation to a distillation operation to produce an overhead distillate product boiling up to about 450° F. and a bottoms product boiling from about 450° F. to said 750° F., solvent extracting said bottoms product with furfural to produce a raffinate phase and an extract phase, recovering solution furfural from the raffinate phase, subjecting the extract phase to a distillation operation and producing an overhead product comprising furfural and a bottoms product comprising a gas oil fraction boiling from about 450° F. to 750° F., combining this latter gas oil fraction with the aforesaid overhead distillate product boiling up to about 450° F. to produce an improved furnace carbon black feed stock in increased yield.

2. A process for producing a furnace carbon black feed stock having a predetermined aniline point and of increased yield based on the feed stock charged to the process comprising the steps of subjecting a catalytic gas oil feed stock boiling from about 400° F. to 750° F. and obtained from a catalytic cracking operation to a distillation operation and recovering therefrom an overhead distillate boiling up to about 450° F. and a kettle product boiling above about 450° F., solvent extracting said kettle product with furfural to produce a raffinate phase containing solution furfural and an extract phase, separating the raffinate hydrocarbons from the furfural in the raffinate phase, returning the separated furfural to the extraction operation and recovering the separated raffinate hydrocarbons as one product of the process, subjecting the extract phase to a distillation operation and separating therefrom an overhead distillate of furfural and a kettle product containing a low aniline point fraction of said gas oil boiling above about 450° F., returning the separated furfural to the extraction operation, combining this low aniline point fraction of gas oil boiling above about 450° F. with the recovered overhead distillate boiling up to about 450° F. to produce said oil of predetermined aniline point and in increased yield.

3. A process for producing a furnace carbon black in increased yield and a nonaromatic gas oil cracking stock from a catalytic gas oil feed stock boiling from about 400° F. to 750° F. and obtained from a catalytic cracking operation comprising the steps of subjecting said catalytic gas oil feed stock boiling from about 400° F. to 750° F. and obtained from a catalytic cracking operation to a distillation operation and recovering therefrom an overhead distillate boiling up to about 450° F. and a kettle product boiling above about 450° F., solvent extracting said kettle product with furfural to produce a raffinate phase containing some solution furfural and an extract phase, separating the raffinate hydrocarbons from the furfural in the raffinate phase, returning the separated furfural to the extraction operation and recovering the separated raffinate hydrocarbons as said nonaromatic gas oil cracking stock as one product of the process, subjecting the extract phase to a distillation operation and separating therefrom an overhead distillate of furfural and a kettle product containing a low aniline point fraction of said gas oil boiling above about 450° F., also returning this latter furfural to the extraction operation, combining this low aniline point fraction of gas oil boiling above about 450° F. with the recovered overhead distillate boiling up to about 450° F. and subjecting this combined oil to furnace carbon black producing conditions, and recovering quality carbon black from the effluent of the carbon black producing operation and in increased yield based on the feed to the carbon black producing operation.

4. The process of claim 3 wherein the furfural-to-oil ratio in the extraction operation is maintained between the limits of 0.5:1 and 5:1.

5. In a process for the solvent extraction of a gas oil having a boiling range from about 350° to 750° F. and produced from a catalytic cracking operation with a solvent having a boiling point below the boiling point of the lowest boiling gas oil constituents to produce an oil having a predetermined aniline point and of increased yield based on the gas oil charge stock to the process wherein upon distillation of the extract phase for solvent recovery the solvent exhibits azeotroping tendencies with constituents of said gas oil boiling below about 450° F. and said constituents tend to distill overhead and to contaminate the recovered solvent, a method for carrying out this process without losing extract hydrocarbons with the overhead solvent from the extract still comprising the steps of subjecting said gas oil to a distillation operation and producing an overhead distillate product boiling below about 450° F., and a bottoms product boiling from about 450° F. to 750° F., solvent extracting the bottoms product with said solvent and producing a raffinate phase and an extract phase, recovering solution solvent from the raffinate phase, subjecting the extract phase to a distillation operation and producing an overhead product of solvent free from extract hydrocarbons and a bottoms product of extract oil, combining this extract oil bottoms with the aforesaid overhead distillate product boiling below about 450° F. to produce said oil of predetermined aniline point and in increased yield.

6. The process of claim 5 wherein the solvent is a solvent selected from the group consisting of furfural and methylcellosolve.

References Cited in the file of this patent
UNITED STATES PATENTS

| Number | Name | Date |
|---|---|---|
| 2,128,885 | Poole | Aug. 30, 1938 |
| 2,507,861 | Manley | May 16, 1950 |
| 2,516,134 | Molique | July 25, 1950 |
| 2,608,470 | Helmers et al. | Aug. 26, 1952 |